April 19, 1960    A. L. PITTINGER ET AL    2,933,317
SOURCE FOR RAY EMISSION
Filed March 24, 1958    3 Sheets-Sheet 1
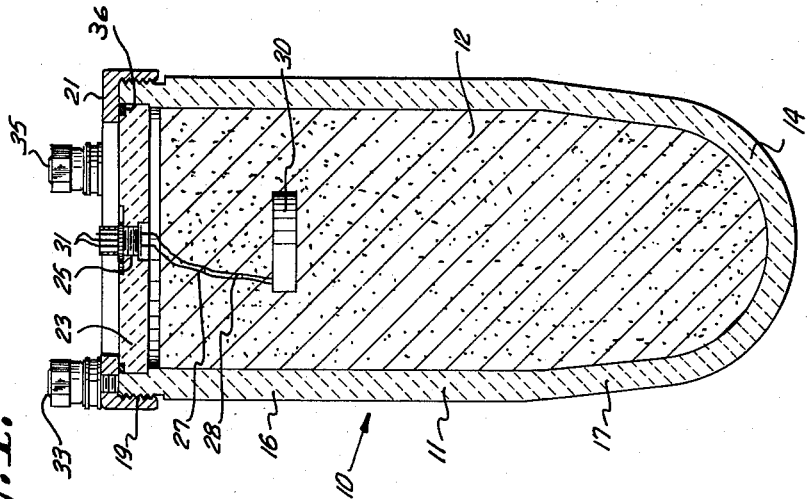
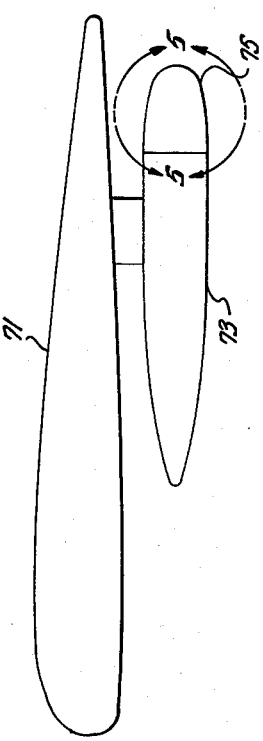
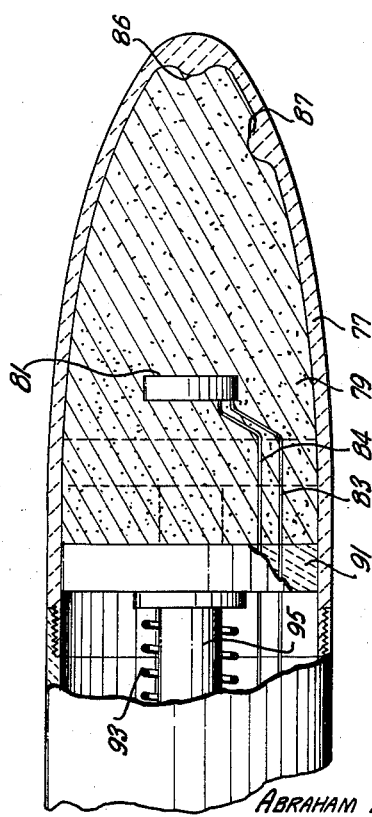
INVENTORS.
ABRAHAM L. PITTINGER
BY RAYMOND W. THOMAS
Christie, Parker & Hale
ATTORNEYS.

April 19, 1960  A. L. PITTINGER ET AL  2,933,317
SOURCE FOR RAY EMISSION
Filed March 24, 1958  3 Sheets-Sheet 2
Fig. 2.
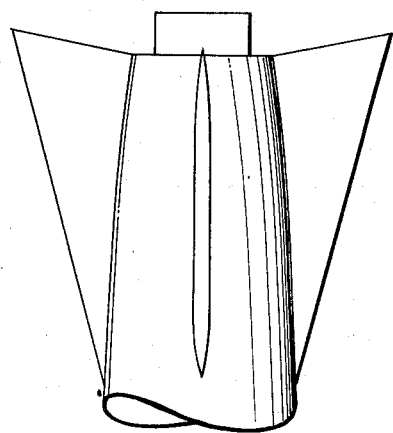
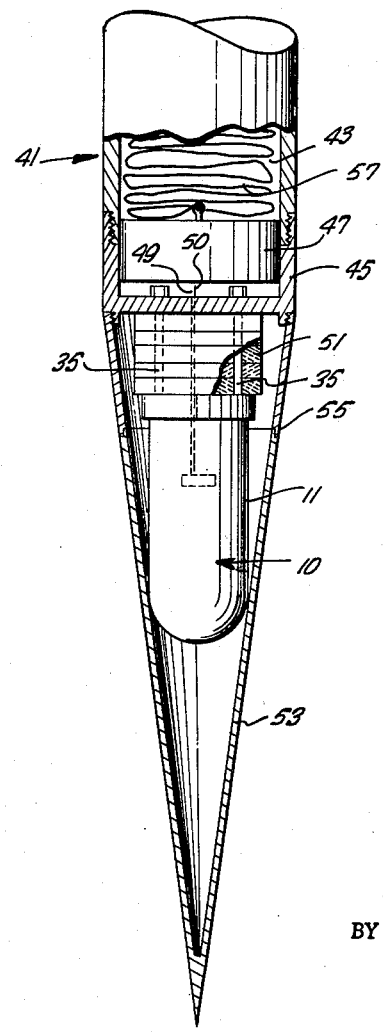
INVENTORS.
ABRAHAM L. PITTINGER
RAYMOND W. THOMAS
BY
Christie, Parker & Hale
ATTORNEYS.

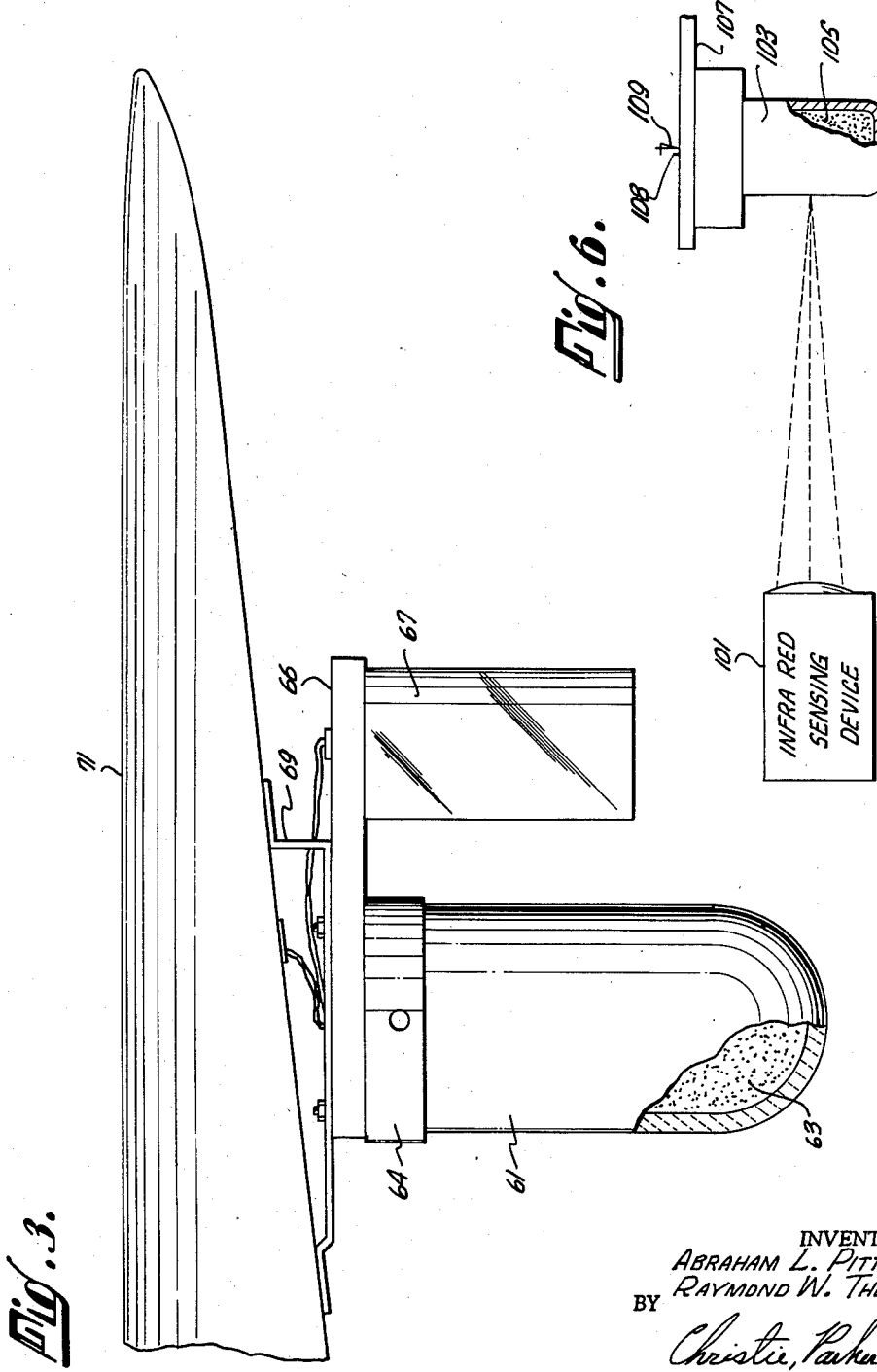

though prior to radiation. Infrared guided missiles may home on the crucible.

United States Patent Office 2,933,317
Patented Apr. 19, 1960

2,933,317

SOURCE FOR RAY EMISSION

Abraham L. Pittinger, Glendora, and Raymond W. Thomas, Pasadena, Calif.; said Raymond W. Thomas assignor to Cooper Development Corp., a corporation of California Application March 24, 1958, Serial No. 723,432

11 Claims. (Cl. 273—105.3)

This invention relates to devices for emitting radiant energy and more particularly to radiant sources in the infrared spectrum.

There has been a recent tendency to supplement radar detection and guidance systems with infrared or "IR" systems. Sources of radiation in the infrared spectrum are useful as target devices in testing equipment and training personnel in weapons having infrared sensitive homing mechanisms. There is also a need for accurate means of calibrating the instruments and the sensing mechanisms used in these fields. The normal operable infrared range is over a wave length span of from 0.7 to approximately 10 microns, with a 0.7 micron wave length being at the borderline of the visible spectrum and 10 microns being the wave length of the rays emitting from a source at about 100° F.

We have developed apparatus useful as target sources for infrared guided missiles and as decoy countermeasure devices against such missiles, and apparatus which may also embody an infrared emitting device for use in calibrating instruments. The invention contemplates a source of radiant energy which comprises a black body crucible which contains an exothermic charge. Means operable to reduce the charge to a molten state are included in the device. A radiating zone on the crucible is defined by a wall adapted to contain substantially all of the molten charge.

The exothermic charge may be alloyed to achieve the desired temperature which, when acting upon a proper black body crucible, radiates rays of a desired wave length. The factors which determine that wave length are the constituents of the exothermic charge, the material of the containing crucible, and the wall thickness and outer configuration of the crucible. The time elasping after initial propagation of the exothermic reaction is also a factor. We have found that a crucible of electrographite is an ideal black body radiator having sufficient mechanical strength to withstand the stresses caused by the exothermic reaction. It is also possessed of sufficient refractory qualities to resist the temperatures which may be upwards of 7000° F.

Preferably, the crucible of the invention is able to contain about eight pounds of an exothermic mixture, such as iron oxide and aluminum. When this charge is ignited it results in a chemical reaction uniting the oxygen from the iron oxide with the aluminum and forming a pool of molten steel topped by a layer of slag. The steel heats the crucible to an outside temperature in the range of 3000° F. Thus, a substantially uniform radiation of infrared rays is caused to emanate from the crucible. This is in marked contrast to the wavering signal output of burning radiation sources which is accentuated by the effect of adiabatic expansion of the gaseous products. The wavering effect increases with increase in altitude.

Infrared guided missiles may home on the crucible. The crucible may be attached to the wings of target drones which are remotely controlled. Alternatively, the crucible may be propelled by rocket to high altitudes and suspended at the peak of its ascent by parachute. The crucible may be balloon-dropped from aircraft or carried by a manned plane to train detection equipment operators.

An advantage of the electrographite crucible of the invention is that the crucible may be formed so that the ray emission is not uniform from all of the outer radiating surface. If the configuration is proper, the rays emitted have a pattern simulating a particular heat source such as a jet engine or a rocket tube.

In the preferred embodiment of the invention the exothermic charge, which is conventionally a finely divided granule, is compressed or compacted. Thus, the crucible may be held to a minimum volume and weight is saved, with the resultant advantages in airborne applications. It is preferred that the igniter capsule be embedded in the charge at the time it is compressed.

The compressing step is advantageous because it aids propagation of the chemical reaction. Under certain environmental conditions uniform propagation throughout a bulk charge is not always obtained. Additionally, compacting the charge reduces the ratio of an initial charge to the end molten charge to about 3 to 2, reducing the portion of the container that must be refractory.

The igniter may be initiated by any conventional control device. It may be triggered by a radio signal, by barometric pressure, or by pre-set timing devices. The crucible and its charge may be combined with a visible indicator which signals when the exothermic charge has been ignited.

In one embodiment of the invention the molten charge is impelled into the radiating zone of the crucible by means such as a plunger. This particular combination may be necessary where the orientation of the crucible prevents dependence upon gravity to localize the molten charge in the radiating zone. These and further advantages of the invention are apparent from the following detailed description and drawings, in which:

Fig. 1 is a sectional elevational view of a source of radiant energy in accordance with the invention;

Fig. 2 is a fragmentary sectional elevation, partly broken away, and illustrating a source of radiant energy combined with means for propelling the source to a high altitude;

Fig. 3 illustrates in fragmentary elevation a source of radiant energy combined with means for visibly indicating when the source exothermic charge has ignited;

Fig. 4 is an elevational view of a source in accordance with the invention suspended from a wing of a target plane;

Fig. 5 is a fragmentary elevation, partly broken away, showing the details of the radiant source of the embodiment of Fig. 4; and Fig. 6 is an elevational view, partly in section, of a radiant source suitable for use as a calibrating device for radiation sensitive instruments.

In Fig. 1 a source 10 of radiant rays such as infrared rays has a black body crucible 11 which contains an exothermic charge 12. The crucible is open at the top. A substantially spherical bottom wall 14 closes the bottom end of the crucible. The upper portion 16 of the crucible is substantially cylindrical in configuration and has a slightly larger diameter than the bottom wall. Conical section 17 joins cylindrical portion 16 to bottom wall 14. The wall thicknesses of all three portions are substantially uniform.

The top of the crucible has an exterior thread 19. A closing collar 21 engages threads 19 and restrains an insulating disk 23 over the top of the exothermic charge. The insulating disk mounts an electrical receptacle 25 centrally of the disk. The receptacle has electrical leads 27, 28 extending to an igniter capsule 30. A plurality of pin plugs 31 provide for electrical connection between the igniter capsule and a source of igniting electricity (not shown).

The closing collar is provided with a plurality of studs 35 to secure the source crucible to the apparatus with which it is used. A resilient ring 36 effects a seal between the disk and the inner wall of the crucible.

Source 10 may contain an exothermic charge such as iron oxide and aluminum. Propagation of this charge may be induced by temperature above 1000° F. Igniter 30, which may be any suitable ignition material capable of being set off by an electrical spark, lodges within the exothermic charge. When the charge is ignited the finely granulated mixture of iron oxide and aluminum reacts chemically and produces great heat. The basic chemical reaction is defined in the formula:

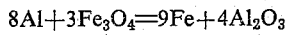

$$8Al + 3Fe_3O_4 = 9Fe + 4Al_2O_3$$

The resultant of this chemical reaction is a pool of molten steel and slag, which, if the crucible is oriented with bottom wall 14 downwardly, tends to collect in the bottom portion of the crucible. The molten steel heats the crucible, which is preferably of an electrographite material, to a temperature in the range of 3000° F. This is the temperature of the exterior wall of the crucible.

At this temperature the crucible radiates rays in the infrared spectrum. Since the walls of the crucible illustrated in Fig. 1 are of uniform thickness, the infrared radiation tends to be uniform for the entire area which the molten steel contacts. The aluminum oxide slag forms on top of the molten steel pool. The slag radiates heat at a lesser rate than does the steel, and acts as a barrier to heat loss by the steel other than to the crucible. Loss of the slag layer is not desirable for this reason. Such a loss may occur when the vapor pressure of the aluminum oxide slag exceeds the atmospheric pressure to which the radiating source is exposed. The average temperature of the reaction is about 5000° F. The vapor pressure of the slag at this temperature is about 760 mm. of mercury. When the atmospheric pressure becomes less than this figure, the slag boils away. Therefore sealing means for the crucible such as ring 36 is preferable for high altitude conditions.

In the preferred embodiment of the invention the exothermic charge is in a compressed form. In Fig. 3 the exothermic charge is illustrated as being in bulk form. The bulk form of the preferred exothermic material is a mixture of commercially available materials. However, the commercially prepared exothermic material has the disadvantage of a bulk reduction of from 5 to 1 when the exothermic reaction has taken place. This means that the crucible volume must be greater than is necessary for the radiation stage which is the basic purpose of the device. Therefore, a compressed charge is preferred since the bulk reduction is in the ratio of from 3 to 2.

If the exothermic charge in Fig. 1 were in bulk form, the radiating zone of the crucible would be defined by bottom wall 14 and conical section 17. With a compressed charge, two-thirds of the crucible volume is the radiating zone.

The embodiment illustrated in Fig. 2 combines the radiant source 10 of Fig. 1 with means for propelling the radiant source to a high altitude. A high altitude rocket designated generally by the reference character 41, has a parachute containing section 43. Section 43 is threadably coupled to a mechanism containing section 45. Within section 45 is lodged a parachute release mechanism 47. The parachute release mechanism may be actuated in any one of the conventional fashions such as remote radio signals, self-contained timing devices, or it may be triggered by barometric pressure. The parachute release mechanism is utilized to ignite the exothermic charge contained within crucible 11 of the radiant source. Electrical leads 49, 50 connect between the parachute release mechanism and the igniter in the crucible.

The crucible may contain either a bulk charge or a compressed charge with the latter type being preferred. Studs 35 of the retaining collar of the crucible are lengthened to extend through a plurality of insulating pads 51 which separate the crucible from the mechanism containing section of the rocket. The electrical leads must pass through these insulating pads. A streamlining nose-cone 53 is attached to the mechanism containing section and shields the crucible from the effects of the rapid ascent through the dense atmosphere directly above the earth. The nose-cone may be jointed at 55. The joint is heat-sensitive so that when the exothermic charge is ignited and the crucible starts to radiate, the heat of the crucible releases the joint and nose-cone 53 falls away, allowing the crucible to radiate infrared rays without interference by the nose-cone. Alternatively, the entire nose-cone may be heat-sensitive and part at a region which exposes the crucible.

Rocket 41 is propelled into the atmosphere and may reach a height of 120,000 feet, or greater, depending on the capabilities of the particular propulsion system. At this altitude the parachute release mechanism may be actuated by any of the means previously described. When it is actuated the rocket parts and a parachute 57 is released. At any selected interval after the release of the parachute the igniter may be touched off and the exothermic reaction takes place and, as described, the nose-cone falls away allowing the infrared rays so induced by the heated crucible to radiate in all directions and serve as a target for heat-seeking missiles or other infrared sensitive devices.

Fig. 2 illustrates one means of impelling the radiating source to a high altitude. Other means may be employed. Such other means are represented by plane-dropped balloon arrays or parachute suspension systems.

Fig. 3 illustrates a means of suspending the radiant source in the upper atmosphere. In that figure a black body crucible 61 containing a bulk exothermic charge 63 is suspended by a closing collar 64 from a mounting bracket 66. The mounting bracket also suspends a visible light source 67. Bracket 66 is fastened to a wing mount 69 which in turn is coupled to the underside of a wing 71 of an airplane.

If the source of radiant rays is used as a missile target, the wing of course will be that of a drone plane. However, if the source is to provide training and instrumentation testing, the radiant source and visible source may be suspended from the wing of a suitable manned airplane.

Source 61 is similar in operation to the radiating source described with respect to Fig. 1. However, in addition to the means for reducing the exothermic charge to a molten state as described in Fig. 1, the combination of Fig. 3 includes means for actuating visible light source 67 when the ignited exothermic charge in crucible 61 reaches a predetermined temperature. The actuating means may be any heat-sensitive device which closes an electrical circuit. The purpose of the visible light source is to alert a pursuing airplane pilot or a ground crew to the presence of a radiant source which has been ignited. The visible indicator shows the location of the radiating source which is to be the next target.

Figs. 4 and 5 illustrate schematically an embodiment of the invention in which a radiating source is equipped with a crucible which has been shaped to simulate a particular heat pattern of radiation. The simulated pattern may be that of a particular jet airplane. In Fig. 4 a wing 71 of the target aircraft suspends a streamlined pod 73 beneath the wing. The pod supports a radiating source 75 at its trailing end. As shown in enlarged detail in Fig. 5, radiating source 75 comprises a crucible 77 of which a compressed exothermic charge 79 occupies the major volume. An igniter capsule 81 is compressed within the exothermic charge and electrical leads 83, 84 extend through the charge to actuating means (not shown).

The wall of the crucible is thickened at points 86 and 87. These thickened sections cause a differing infrared radiation pattern to emanate from those particular zones of the crucible. The wall thickness may be varied differently to simulate a wide range of heat distribution patterns. Thus when the crucible reaches a radiating stage due to the exothermic reaction of the compressed charge within the crucible the particular pattern emanating acts as a target for a heat-seeking missile which has been designed to "home" on a particular heat pattern and disregard general radiation not conforming to that pattern.

In the illustrated orientation the radiating zone of the crucible is not situated so that the gravitational effect causes the molten steel to concentrate in that zone. Therefore, means are provided to impel the molten charge into the radiating zone. A plunger 91 having an exterior diameter substantially the same as the interior diameter of the crucible is impelled toward the radiating zone by means such as a compression spring 93. The compression spring and the plunger shaft 95 may be contained within the pod supporting the crucible.

Hydraulic or electrical means actuated by the heat of the exothermic reaction may be substituted for the compression spring. The igniter and the electrical lead stemming from it do not interfere with the horizontal progress of the plunger since they are destroyed by the heat of the chemical reaction.

Fig. 6 illustrates an infrared sensitive device 101 which it is desired to calibrate. Calibration may be achieved by means of a black body radiating crucible 103 having an exothermic charge 105 contained within it. The crucible is suspended from a framework 107. Electrical leads 108, 109 extend from an igniter capsule (not shown) to any convenient source of an electrical spark.

Crucible 103 has a uniform wall thickness. Therefore, radiation from all parts of the crucible should be substantially identical at any given point in time after propagation of the exothermic charge.

The external temperature of the crucible and thereby the particular infrared radiation wave length may be easily calculated with respect to the time that propagation is first induced.

Given crucibles of a standard wall thickness and a precisely prepared exothermic charge, precise standards of radiation may be easily arrived at. Propagation of the charge when a compressed exothermic charge is used is very uniform and reliable. Therefore a charge of a given mixture within a crucible of uniform wall thickness radiates in substantially the same infrared spectrum each time the standard charge and crucible are used. The propagation time is substantially the same for each firing of a crucible. Therefore each time a standard charge is propagated the exothermic reaction takes the same time span to reach its peak and the standard crucible heats to radiating temperature within an identical time increment each time such a crucible is fired. A substantially identical infrared radiation emanates at a certain time increment after propagation from any of the standardized exothermic charges within a standardized crucible.

The various specific embodiments illustrated in the foregoing description are indicative of the range of utility of the invention. These illustrative usages do not exhaust the possibilities and potentialities of the invention. Embodiments of the invention have utility wherever a uniform, non-fluctuating, radiation of infrared or similar heat propagated radiant energy is desirable.

We claim:

1. A source of radiant energy comprising a black body crucible, an exothermic charge contained in the crucible, means operable to reduce the charge to a molten state, and a radiating zone on the crucible defined by a wall adapted to contain substantially all of the molten charge.

2. Apparatus in accordance with claim 1 in which the wall defining the radiating zone is varied in configuration to radiate rays to simulate a predetermined heat distribution pattern.

3. Apparatus in accordance with claim 1 in which the crucible is comprised of electrographite.

4. Apparatus in accordance with claim 1 including sealing means adapted to retain the exothermic charge and the products resulting from its reduction to a molten state within the crucible.

5. A source of radiant energy comprising a black body crucible, an exothermic charge contained in the crucible, means operable to reduce the charge to a molten state, and a radiating zone on the crucible defined by a wall adapted to contain substantially all of the molten charge, said wall being of uniform thickness so that substantially identical rays are emitted from all portions of the radiating zone.

6. A source of radiant energy comprising a black body crucible, an exothermic charge contained in the crucible, means operable to reduce the charge to a molten state, a radiating zone on the crucible defined by a wall adapted to contain substantially all of the molten charge, and means operable to impel the molten charge into the radiant zone of the crucible.

7. A source of radiant energy comprising a black body crucible, a compressed exothermic charge contained in the crucible, means operable to reduce the charge to a molten state, and a radiating zone on the crucible defined by a wall adapted to contain substantially all of the molten charge.

8. Apparatus in accordance with claim 7 in which the means operable to reduce the charge to a molten state is in part molded into the compressed charge.

9. A source of infrared rays comprising a black body crucible, an exothermic charge contained within the crucible, a streamlining nose-cone, means for propelling the crucible to a high altitude, means operable to reduce the charge to a molten state so that the crucible is heated to a temperature at which it emits rays in the infrared spectrum, and means for attaching the nose-cone to the crucible so that the heat inducing the radiant rays releases the nose-cone from the crucible.

10. In a device for emitting rays in the infrared spectrum the combination comprising a refractory container, a hollow radiant black body nose connecting volumetrically with the container, a compressed exothermic charge within the container and the nose, means for propelling the container to a high altitude, a streamlining nose-cone, means for suspending the container at a high altitude, means for reducing the compressed charge to a molten state so that the molten charge contacts substantially the entire inner surface of the nose and heats the nose to radiant temperature, and coupling means between the nose and the nose-cone adapted to be severed by the heat which induces the radiant spectrum.

11. In a device for emitting rays in the infrared spectrum the combination comprising a black body crucible, an exothermic charge contained in the crucible, first means for reducing the charge to a molten state, a radiant zone on the crucible for containing the molten charge, a visible signal source, and second means adapted to actuate the visible signal source when the exothermic charge generates a predetermined degree of heat.

References Cited in the file of this patent

UNITED STATES PATENTS 1,768,519    McLagan _____ June 24, 1930